United States Patent
Woerner et al.

(10) Patent No.: US 11,271,716 B1
(45) Date of Patent: Mar. 8, 2022

(54) BLOCKCHAIN-BASED DATA MANAGEMENT OF DISTRIBUTED BINARY OBJECTS

(71) Applicant: emTRUTH, Inc., Glendale, CA (US)

(72) Inventors: Irene Wong Woerner, Glendale, CA (US); Ronald Chi King Kong, Pasadena, CA (US)

(73) Assignee: emTRUTH, Inc., Glendale, CA (US)

(*) Notice: Subject to any disclaimer, the term of this patent is extended or adjusted under 35 U.S.C. 154(b) by 0 days.

(21) Appl. No.: 17/161,356

(22) Filed: Jan. 28, 2021

(51) Int. Cl.
  *H04K 1/00* (2006.01)
  *H04L 9/06* (2006.01)
  *G06F 11/32* (2006.01)

(52) U.S. Cl.
  CPC .......... *H04L 9/0618* (2013.01); *G06F 11/327* (2013.01); *H04L 9/0643* (2013.01)

(58) Field of Classification Search
  CPC ..... H04L 9/0618; H04L 9/0643; G06F 11/327
  USPC ......................................................... 380/28
  See application file for complete search history.

(56) References Cited

U.S. PATENT DOCUMENTS

| | | | | |
|---|---|---|---|---|
| 9,916,458 | B2* | 3/2018 | Manville | G06F 16/134 |
| 10,454,918 | B1* | 10/2019 | Uhr | H04L 9/3239 |
| 10,637,645 | B2* | 4/2020 | Gray | G06F 21/51 |
| 10,831,903 | B2* | 11/2020 | Li | G06F 21/602 |
| 2004/0215962 | A1* | 10/2004 | Douceur | H04L 9/3236 |
| | | | | 713/167 |
| 2015/0143136 | A1* | 5/2015 | Barney | H04L 9/14 |
| | | | | 713/193 |
| 2019/0386990 | A1* | 12/2019 | Liu | H04L 9/3226 |
| 2020/0089663 | A1* | 3/2020 | Padmanabhan | G06F 21/64 |
| 2020/0175138 | A1* | 6/2020 | Nordstrom | H04L 63/0428 |
| 2020/0242354 | A1* | 7/2020 | Ligman | H04L 9/3231 |
| 2021/0074120 | A1* | 3/2021 | Ragnoni | H04L 9/0637 |

* cited by examiner

*Primary Examiner* — Amare F Tabor
(74) *Attorney, Agent, or Firm* — Womble Bond Dickinson (US) LLP

(57) ABSTRACT

A method of blockchain-based data management of distributed binary objects includes identifying a binary object to be stored in a first data store. The method further includes encrypting, by a processing device, the binary object using a cryptographic function of a blockchain to generate an encrypted binary object. The method further includes storing the encrypted binary object in the first data store. The method further includes storing a reference to the encrypted binary object on the blockchain.

14 Claims, 6 Drawing Sheets

200

T-Block 1 202

T-Block 2 204

T-Block 3 206

.
.
.

T-Block N 208

Fig. 2

BLOCKCHAIN-BASED DATA MANAGEMENT OF DISTRIBUTED BINARY OBJECTS

FIELD

The present invention relates to the field of cybersecurity and in particular, relates to blockchain-based data management of distributed binary objects.

BACKGROUND

Contemporary blockchain blocks include a file in which data pertaining to the most recent transactions on the blockchain network is permanently recorded. Each block can be likened to a page of a ledger, with the blocks chaining together to comprise the decentralized ledger that underpins the blockchain network. Size and location restrictions determine how much data can be written to a single block and where that block can be stored.

BRIEF DESCRIPTION OF THE DRAWINGS

FIG. 2 is a block diagram illustrating blockchain transaction blocks, in accordance with some embodiments.

DETAILED DESCRIPTION

Figure 1:
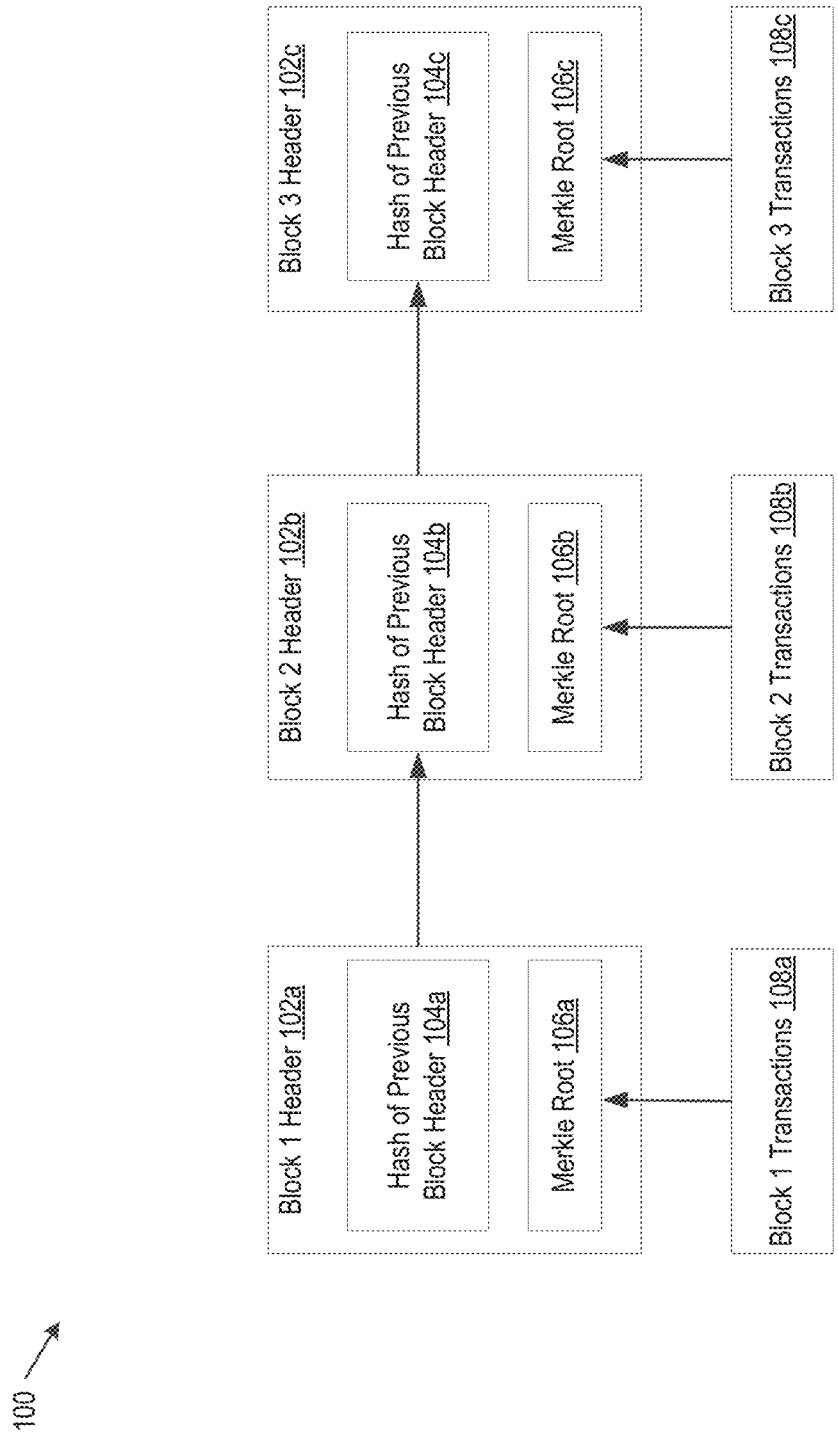
FIG. 1 is a block diagram illustrating a blockchain system, in accordance with some embodiments.

The present disclosure relates to the field of secure data management. Specifically, the embodiments described herein provide for using blockchain technology for cryptographically-enforced methods of managing binary objects (binary files, objects, files, etc.) residing on any connected and distributed data store. Embodiments enable management of any binary object of any size, format, and location. The platforms and systems herein overcome limitations of existing blockchain applications without associated performance impact.

The embodiments provided herein enable the use of blockchain for secure data management; specifically, the ability to combine and secure structured or unstructured data on-demand without additional technological intervention. Once data is transformed into finer granularity data, data blocks become like little building blocks of data that allow users to combine and share in a variety of ways.

For example, with structured data, rather than a dataset in one centralized database, blockchain data blocks can be distributed anywhere with different data owners controlling access of who can use (e.g., access) these specific blocks. In one example, medical records databases can now be transformed into separate blocks for an individual patient record, which can further be broken down to lower level data blocks like patient demographic and a data block for every medical event, such as a positive Covid test.

The embodiments described herein have the ability to hyperlink these different blockchains together, such that patient demographic data is linked to their Covid test results block that has an anonymized identifier. This Covid test data block can now be shared separately with, for example, public health for that geography without disclosing identify unless explicitly authorized.

The ability to aggregate and share data on demand at an enterprise industrial level is due to 1) an ability to blockchain any data of any size or format and 2) an ability to hyperlink blockchains for on demand aggregation. These hyperlinks are also captured in blockchain for immutable audit functionality. Advantageously, the embodiments described herein provide for the ability to securely manage distributed data virtualization where metadata (e.g., original source, tags like Covid or hypertension as comorbidities, schema from original source, etc.) is part of each individual building blocks. This allows truly distributed data while facilitating search and discovery.

The solutions described herein stem in part from disagreement in the blockchain community regarding underlying data blocks and formats (e.g., sizes). The size of a block imposes a limit on the number of transactions that the blockchain network is capable of processing per second, and thus can be seen to inhibit a network's ability to scale. When blocks fill, the network becomes congested, and transaction fees rise dramatically.

At the start of 2013, the average Bitcoin block size was approximately 125 kilobytes. By May 2015, increasing adoption had led to a 240% rise in block size since 2013—from 125 KB to roughly 425 KB—however, one crypto trade tool provider then estimated that blocks were hitting the 1 MB limit at least four times daily on average. By 2015, the increasing prevalence of blocks near the limit of transactional data began to pervade the mainstream cryptocurrency zeitgeist, with concerns pertaining to a significant slowdown in the processing of transactions and an increase in fees being brought to the fore.

The resulting increased fees and delays in the processing of transactions were seen to undermine the core utilities underpinning BTC, with many within the community concerned that network congestion and an increase in the cost of transfers would render Bitcoin redundant as a means of exchange. At the time, one crypto trade tool provider estimated that at least some otherwise-acceptable transactions are seeing delayed confirmations due to capacity issues on the network 3% of the time since the beginning of the year.

As described, a tradeoff for storing larger and larger blocks is the cost of recording a new block as a function of processing speed as well as exposure to malicious congestion and denial of service attacks. Advantageously, blockchain-based data management of distributed binary objects is a solution rooted in technology that brings the immutability of blockchain to monitoring of networked devices.

As described herein, to solve the above problems and others, the systems and methods described herein provide for a variety of features and benefits, including: the scalability of blockchain as barrier for enterprise applications; the use of blockchain for data management instead of transaction tracking as in tokenized systems; expanding the blockchain model to any binary objects stored in any connected distributed data stores; enabling blockchain solutions of any size or format; using a blockchain engine to manage consensus of appending a new data block (e.g., creating an abstraction layer for blockchain systems that uses blockchain engine for data management while enabling data to be resident anywhere); using blockchain engines to manage keys that cryptographically link parent to child block with same encryption keys that tie parent-child relationship to cryptographically link binary objects as part of the same blockchain; perform hash comparisons of binary objects to ensure the binary objects have not been tampered with when blockchain and/or files are accessed, as well as periodic monitoring for overall system integrity; alerting if hash does not match to initiate mitigation actions; and logging all access to binary objects in the blockchain at the system level.

FIG. 1 is a block diagram illustrating a blockchain system 100, in accordance with some embodiments. Although specific components are disclosed in blockchain system 100, it should be appreciated that such components are examples. That is, embodiments of the present invention are well suited to having various other components or variations of the components recited in blockchain system 100. It is appreciated that the components in blockchain system 100 may operate with components other than those presented, and that not all of the components of blockchain system 100 may be required to achieve the goals of blockchain system 100.

Blockchain system 100 may be a peer-to-peer networking system. Operations (e.g., transactions) of blockchain system 100 may be managed collectively by peers in the system. Transactions may occur between peers directly and may be recorded on the blockchain itself.

In FIG. 1, blockchain system 100 is a distributed, peer to peer private or public database that includes a variety of components, including blockchain headers (102a-c) and block transactions (108a-c), and subcomponents, including hashes of previous block headers (104a-c), Merkle Roots (106a-c), and transactions (110a-c). In one embodiment, each block contains a record of recent transactions (e.g., transactions 110a) and a header (e.g., 102a) including a reference to the block that came before it (e.g., 104a) among other data (e.g., a timestamp).

In one embodiment, as described herein, data contained in a block header and/or block transaction data may include data relating to a triggering event that led to a creation of a new block. A distributed ledger provides a universal state layer, a public or private infrastructure in the form of a distributed record of transactions on a peer to peer network with synchronized peer nodes.

As described herein, a block comprises a file (e.g., header 102a) in which data pertaining to the most recent transactions (e.g., 108a-c) on the blockchain network is permanently recorded. Each block can be likened to a page of a ledger, with the blocks "chaining" together to comprise the decentralized ledger that underpins the blockchain network.

Those bundled transactions may be confirmed by consensus method before they are added to the blockchain as new blocks. The size of a block creates a limit on the number of transactions that can be verified with each block. As such, larger blocks require greater computation power and will take longer to be mined. Blocks exceeding the limit may be rejected by the network. During cryptocurrency's infancy, blocks were limited to carry no more than 36 megabytes of transaction data each. However, the block size was reduced to 1 MB on Jul. 14, 2010 in order to counter both the threat of transactional spam clogging up the network and potential distributed denial-of-service (DDoS) attacks.

Universal consensus regarding an ideal block size was not found, and core developers predicted that the rate of transactions hosted by the network may exceed the available block space in future, arguing in favor of an increase to the 1 MB limit shortly after it was put in place. Since the introduction of the 1 MB block limit, the number of transactions processed per second by the Bitcoin network has largely oscillated between two and seven. Bitcoin recently increased data block sizes to 10 MB which is still not useful for enterprise data. For example, single MRI from healthcare or even a simple CAD model would greatly exceed 10 MB.

Blockchain applications have focused on small data blocks. Examples include, but not limited to, currency or tokens in distributed wallets or certificates of authentication for chain of custody. This limitation in size prevents applications to complex products, like an airplane that is comprised of millions of parts from thousands of suppliers across a globally distributed supply chain or healthcare data that includes large binaries like MRI and often required to maintain a complete data history of at least seven years. Additionally, complex products have associated large dataset that includes, but is not limited to, three dimensional models, diagrams or simulations.

FIG. 2 is a block diagram illustrating blockchain 200 transaction blocks 202-208, in accordance with some embodiments. In one embodiment, each of the transaction blocks (e.g., T-blocks) 202-208 may contain transaction data. As illustrated the blockchain 202 is a sequence of T-blocks 202-208. Each T-block (e.g., 202-208) in the blockchain 202, may consist of a list of transactions. Each transaction may then contain a list of data fields that describe that particular transaction. As described herein, transaction data may include a location of a binary object stored in a distributed and redundant file system. The transaction data may also include a cryptographic hash of the encrypted or unencrypted binary object. In another embodiment, the data fields may also include a cryptographic key allowing for the encryption and/or decryption of the binary object.

In one embodiment, transaction data itself is encrypted. In one embodiment, the current embodiments expand the model of a blockchain to include binary objects that are encrypted using the same keys as each associated data block, thereby expanding a virtual blockchain system beyond the confines of a specific blockchain platform. Advantageously, this allows for bypass of the current size limits on blocks in existing blockchain systems, such as Hyperledger, Bitcoin, and Ethereum. Advantageously, using the embodiments described herein, blockchaining data of any size and format is possible, and stored in any location (e.g., in one or more data stores of one or more distributed and redundant file systems.

As described herein, binary objects may be stored on a distributed and redundant file system and may be immutably associated with a transaction on a blockchain. In one embodiment, this immutable association may be accomplished by hashing the entire binary object with the associated blockchain identifier as part of the encryption. Creating this association is akin to extending the Merkle tree concept beyond a single expression of a blockchain leaf to include hashed files sharing the same child encryption outside of a single block of data.

Figure 3:
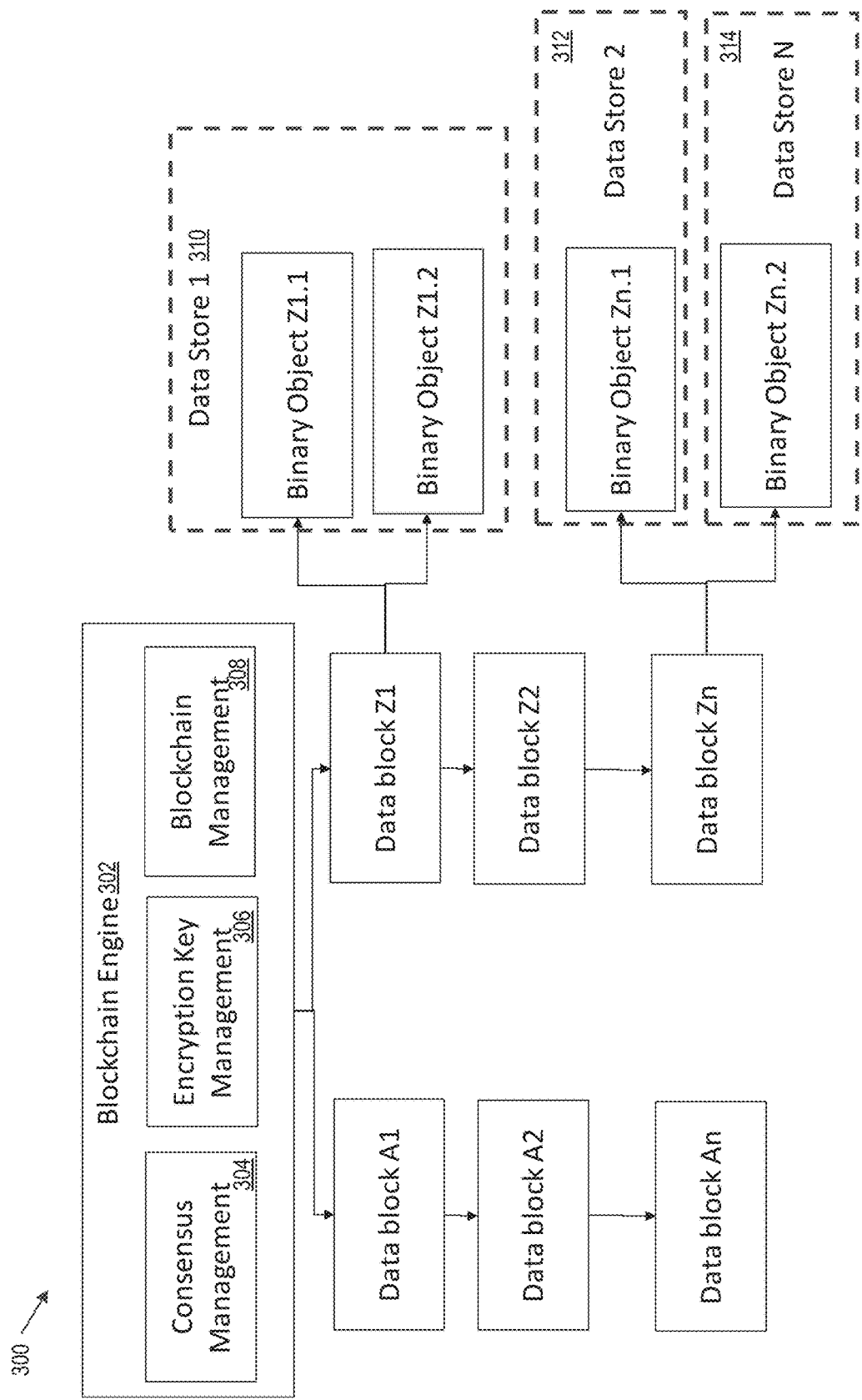
FIG. 3 is a block diagram illustrating blockchain-based data management of distributed binary objects, in accordance with some embodiments.

FIG. 3 is a block diagram 300 illustrating blockchain-based data management of distributed binary objects, in accordance with some embodiments. In the current embodiments, a blockchain is a hash tree, managed by a blockchain engine (e.g., 302). In one embodiment, blockchain engine 302 may include a variety of subcomponents, including a consensus management component 304, an encryption key management component 306, and/or a blockchain management component 308. In other embodiments, less or more components that those depicted may be utilized. Components 304-308 may be used by processing logic to perform a variety of actions. For example, components 304-308 of blockchain engine 302 may label every leaf node if a hash tree with the hash of a data block (e.g., Al—Zn), and every non-leaf node may be labelled with the cryptographic hash of the labels of its child nodes. Meta or description information about a connected device may also be captured in the blockchain.

In various embodiments, blockchain systems may have different types of consensus methods, including consensus algorithms: Proof of Work (PoW), Proof of Stake (PoS), Proof of Authority (PoA) or Delegated Proof of Stake (DPoS). Consensus management component 304 ensures that all participants dispose of identical copies of distributed database files like individual blockchains in a peer node.

Furthermore, blockchains may create a child key by using a known seed from a parent block. These related seeds are what uniquely ties a child block to a parent block. Managing these keys and their relationships is a core function of the encryption key management component 306.

In one embodiment, each blockchain has a unique identifier. In one embodiment, each binary object stored in a data block may be encrypted using the associated blockchain's unique identifier. This association of binary objects to a blockchain becomes a virtual extension of a blockchain expressed as binary objects, wherein hashed binary objects become children on a hash tree, as well as a non-identical twin of the child node on the blockchain hash itself. The hashing with a blockchain's unique identifier makes each associated binary object immutably tied to a blockchain capturing data descriptive of a connected device.

The current embodiments combine the features of Merkle Trees, peer-to-peer networking, and any media storage to overcome block-size and storage-location limitations in current blockchain platforms, while maintaining inherent immutability and peer to peer principles.

For example, in one embodiment, the same encryption keys and hash associated with each individual blockchain is used to encrypt any associated binary objects (as managed by encryption key management component 306), thus extending the blockchain model to any binary objects stored in any storage location (e.g., in a distributed network such that represented by data store 310, 312, and 314). Child block keys may include keys or hashes of parent blocks. This same approach may be extended to associated binary objects which combines the Merkle Tree model and extends any blockchain platform ability to support blocks of theoretical unlimited size and storage location.

Figure 4:
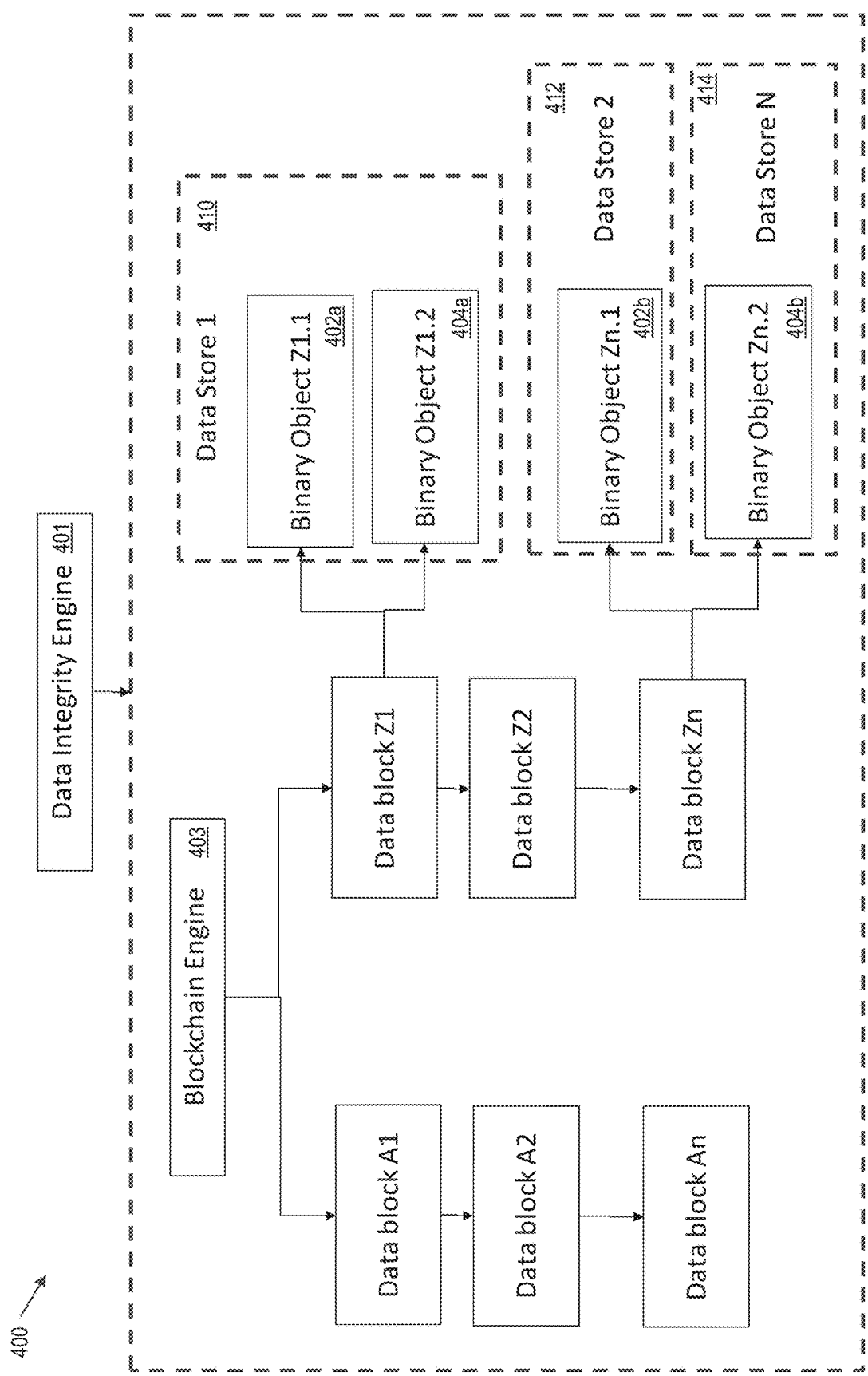
FIG. 4 is a block diagram illustrating a data integrity engine corresponding to blockchain-based data management of distributed binary objects, in accordance with some embodiments.

FIG. 4 is a block diagram 400 illustrating a data integrity engine corresponding to blockchain-based data management of distributed binary objects, in accordance with some embodiments. In one embodiment, to maintain the integrity of the peer-to-peer functionality, as well as redundancy in a distributed network, associated binary objects may also be replicated at one or more additional peer nodes. For example, binary object 402a may have a redundant copy (binary objection 402b) stored on a different node of a distributed storage system as the original (see data store 410 vs. data store 412. Likewise, data integrity engine 401 or blockchain engine 403 (which may be the same as blockchain engine 302 of FIG. 3) may copy binary object 404a on data store 410 to create redundant copy 404b on data store 414.

In one embodiment, algorithms (e.g., via data integrity engine 401) may perform consistency checks periodically and/or when accessing binary objects to ensure such binary objects associated with peer nodes remain synched and/or have not been tampered with. This approach supports any implementation of blockchain validation when creating new child nodes, including consensus between peers like proof of work, proof of stake or proof of authority.

Associated binary objects may be stored on a distributed and redundant file system or any heterogeneous data store and are immutably bound as part of the extended blockchain managed by the blockchain engine 403. As described, this immutable association may be accomplished by hashing the entire binary object with the associated blockchain identifier as part of the encryption. Creating this association is akin to extending the Merkle Tree concept beyond a single expression of a blockchain leaf to include hashed files sharing the same child encryption outside of a single block of data.

After decryption (e.g., using the blockchain-linked encryption key), one or more algorithms or models may also compare hashed binary objects in distributed data stores to ensure associated binaries have not been tampered with for blockchain-based immutability. Any differences may create an alert that binary objects in corresponding data stores have been compromised to trigger mitigation actions.

In one embodiment, the embodiments described herein allow processing logic to perform a bit-level comparison of an extracted binary object (either raw or encrypted) against an authoritative cryptographic hash. Should a comparison result in a mismatch, an embodiment of the current invention may send an alert or notification to a pre-defined set of users indicating potential compromise of the binary object as part of active data monitoring. An alert or notification may include, for example via a link or QR code, that provides secure access to the blockchain containing descriptive information.

In one embodiment, on a set periodic basis, processing logic may compare a binary object with a copy of that binary object to ensure that the two versions are synchronized. If it is determined that the two versions do not may, the authentic version may be determined by comparing the two versions to the authoritative cryptographic hash, and the anomalous version of the binary object may be replaced to maintain redundancy.

Figure 5:
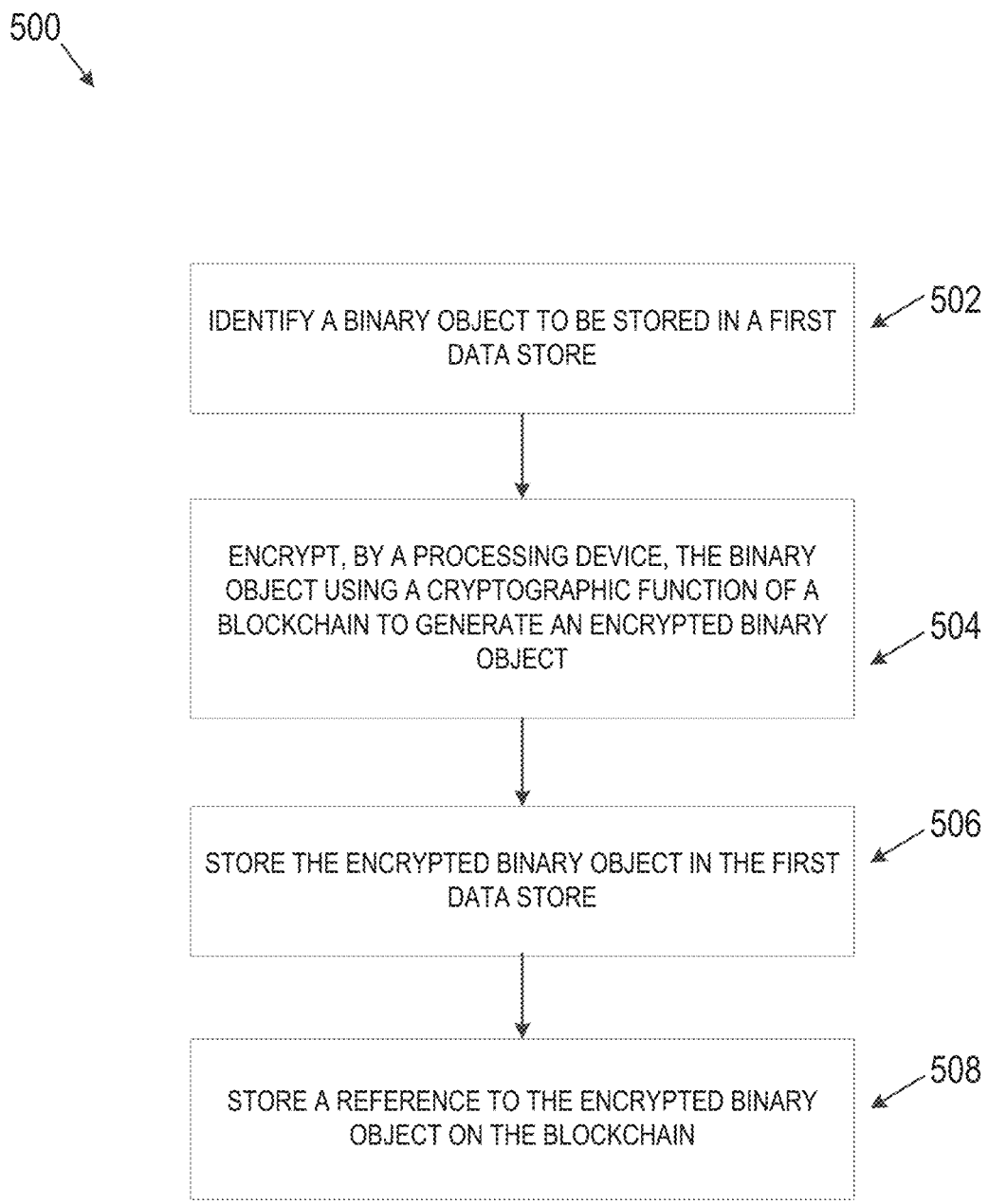
FIG. 5 is a flow diagram illustrating blockchain-based data management of distributed binary objects, according to one embodiment.

FIG. 5 is a flow diagram illustrating blockchain-based data management of distributed binary objects, according to one embodiment. The method 500 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 5, processing logic at block 502 may identify a binary object to be stored in a first data store. On another embodiment, the binary object may already be stored in the first data store. At block 504, processing logic may encrypt (e.g. by a processing device) the binary object using a cryptographic function of a blockchain to generate an encrypted binary object. For example, in one embodiment, processing logic may use the same cryptographic function utilized by a block of the blockchain, to which a reference to the binary object is to be stored.

At block 506, processing logic may store the encrypted binary object in the first data store and may further store a reference to the encrypted binary object on the blockchain (508). In one embodiment, the reference to the binary object may include a location of the binary object in the first data store (e.g., an identifier of the data store and a location of the binary object within the data store). In another embodiment, the reference may include an authoritative cryptographic hash of the encrypted binary object. The authoritative cryptographic has may be defined as a cryptographic hash of the original and valid binary object, against which future cryptographic hashes of the binary object may be compared to protect against tampering and data corruption.

For example, in one embodiment, processing logic may generate a contemporary cryptographic hash of the encrypted binary object and determining that the contemporary cryptographic hash does not match the authoritative cryptographic hash. In such a scenario, processing logic may provide an alert of the determining and/or take other remedial action.

In one embodiment, processing logic may also manage redundancy and synching or the binary object. For example, in one embodiment, processing logic may generate a copy of the encrypted binary object and store the copy of the encrypted binary object in a second data store. In one embodiment, the second data store is distributed from the first data store. In another embodiment, the two data stores may be the same, or within the same network of data stores.

Processing logic may further periodically determine whether the stored binary object and the copy of the binary object are identical and regenerating the copy of the encrypted binary object (or the original binary object, depending on which version is determined to be correct) to synchronize the copy of the binary object with the binary object when the stored binary object and the copy of the binary object are determined to not be identical.

Processing logic may further receive a request to access the binary object and provide the encrypted binary object in response to receiving the request. Processing logic may log data, associated with the accessing of the binary object, in the blockchain, to maintain a record of actual and attempted access to the binary object. In another embodiment, processing logic may verify authenticity before providing access to the binary object. For example, processing logic may generate, in response to receiving the request to access the binary object, a contemporary cryptographic hash of the encrypted binary object. Processing logic may further determine that the contemporary cryptographic hash does not match the authoritative cryptographic hash and providing an alert of the determining and/or take other remedial actions. For example, processing logic may deny access to the anomalous binary object based on the determination.

Figure 6:
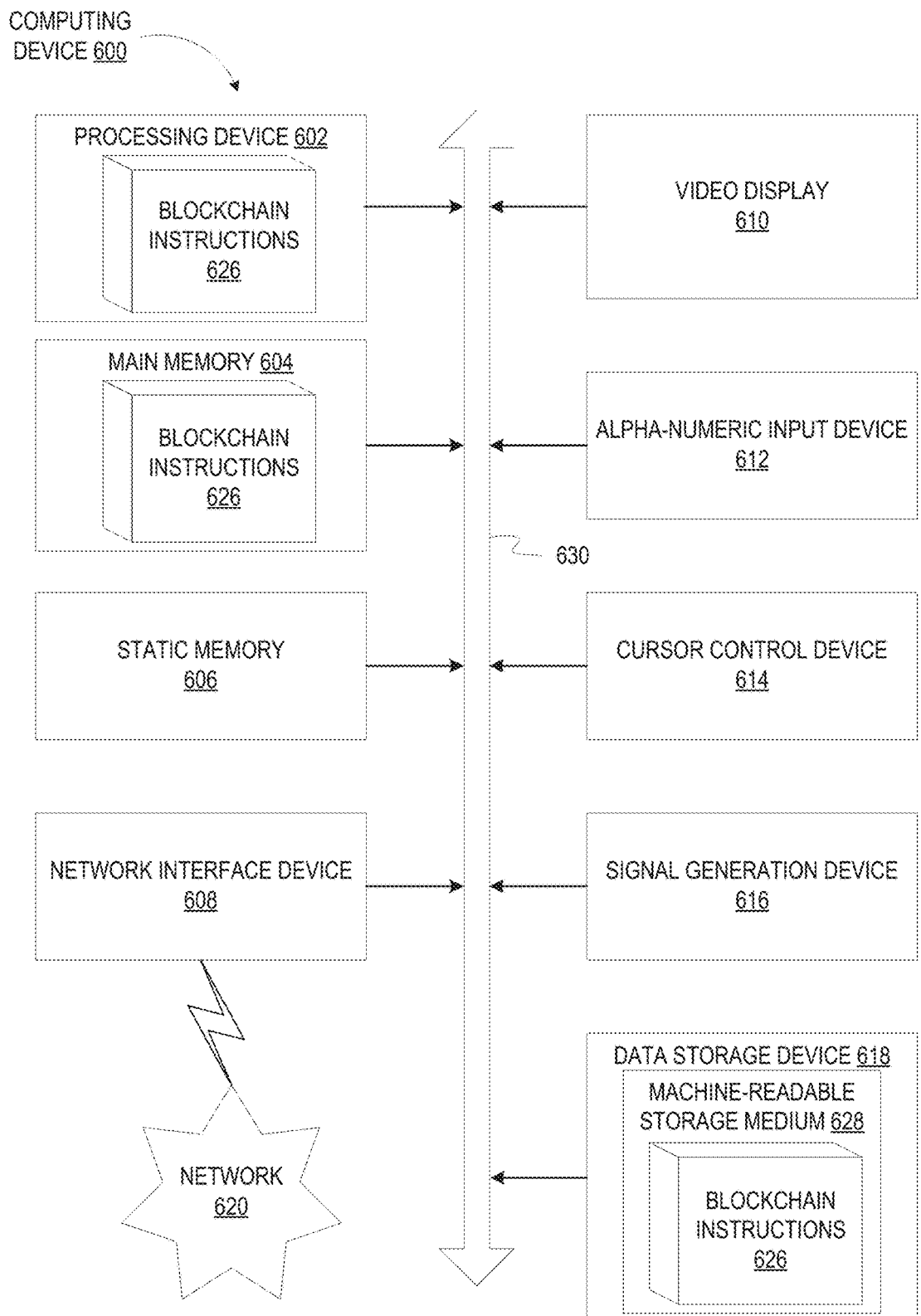
FIG. 6 is a block diagram of an example apparatus that may perform one or more of the operations described herein, in accordance with one embodiment.

FIG. 6 is a block diagram of an example apparatus that may perform one or more of the operations described herein, in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing blockchain logic/instructions 626, for performing the operations and steps discussed herein.

The data storage device 618 may include a non-transitory machine-readable storage medium 628, on which is stored one or more set of blockchain logic/instructions 626 (e.g., software) embodying any one or more of the methodologies of functions described herein, including instructions to cause the processing device 602 to execute operations described herein. The blockchain logic/instructions 626 may also reside, completely or at least partially, within the main memory 604 or within the processing device 602 during execution thereof by the computer system 600; the main memory 604 and the processing device 602 also constituting machine-readable storage media. The blockchain logic/instructions 626 may further be transmitted or received over a network 620 via the network interface device 608.

While the non-transitory machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method of blockchain-based data management of distributed binary objects, comprising:
   identifying a binary object to be stored in a first data store;
   encrypting, by a processing device, the binary object using a cryptographic function of a blockchain to generate an encrypted binary object;
   storing the encrypted binary object in the first data store;
   encrypting, by the processing device, a different binary object using the cryptographic function of the blockchain to generate a different encrypted binary object;
   storing the different encrypted binary object in a different data store;
   storing, on the blockchain, a reference to the encrypted binary object in the first data store and the different encrypted binary object in the different data store, wherein the reference is configured to aggregate, responsive to an interaction with the reference, the encrypted binary object and the different encrypted binary object to generate an aggregated encrypted binary object having a data size that exceeds a maximum data size associated with each block of the blockchain;
   generating a copy of the encrypted binary object;
   storing the copy of the encrypted binary object in a second data store distributed from the first data store;
   periodically determining whether the stored binary object and the copy of the binary object are identical; and
   regenerating the copy of the encrypted binary object to synchronize the copy of the binary object with the binary object when the stored binary object and the copy of the binary object are determined to not be identical.

2. The method of claim 1, wherein the reference to the binary object comprises: a location of the binary object in the first data store and an authoritative cryptographic hash of the encrypted binary object.

3. The method of claim 2, further comprising:
   generating a contemporary cryptographic hash of the encrypted binary object;
   determining that the contemporary cryptographic hash does not match the authoritative cryptographic hash; and
   providing an alert of the determining.

4. The method of claim 2, further comprising:
   receiving a request to access the binary object;
   providing the encrypted binary object in response to receiving the request; and
   logging data, associated with the accessing of the binary object, in the blockchain.

5. The method of claim 4, further comprising:
   generating, in response to receiving the request to access the binary object, a contemporary cryptographic hash of the encrypted binary object;
   determining that the contemporary cryptographic hash does not match the authoritative cryptographic hash; and
   providing an alert of the determining.

6. A system, comprising:
   a memory to store a binary object; and
   a processing device operatively coupled to the memory, the processing device to:
      identify the binary object to be stored in a first data store;
      encrypt the binary object using a cryptographic function of a blockchain to generate an encrypted binary object;

store the encrypted binary object in the first data store;

encrypt a different binary object using the cryptographic function of the blockchain to generate a different encrypted binary object;

store the different encrypted binary object in a different data store;

store, on the blockchain, a reference to the encrypted binary object in the first data store and the different encrypted binary object in the different data store, wherein the reference is configured to aggregate, responsive to an interaction with the reference, the encrypted binary and the different encrypted to generate an aggregated encrypted binary object having a data size that exceeds a maximum data size associated with each block of the blockchain;

generate a copy of the encrypted binary object;

store the copy of the encrypted binary object in a second data store distributed from the first data store;

periodically determine whether the stored binary object and the copy of the binary object are identical; and regenerate the copy of the encrypted binary object to synchronize the copy of the binary object with the binary object when the stored binary object and the copy of the binary object are determined to not be identical.

7. The system of claim 6, wherein the reference to the binary object comprises: a location of the binary object in the first data store and an authoritative cryptographic hash of the encrypted binary object.

8. The system of claim 7, the processing device further to:

generate a contemporary cryptographic hash of the encrypted binary object;

determine that the contemporary cryptographic hash does not match the authoritative cryptographic hash; and provide an alert of the determining.

9. The system of claim 7, the processing device further to:

receive a request to access the binary object;

provide the encrypted binary object in response to receiving the request; and log data, associated with the accessing of the binary object, in the blockchain.

10. The system of claim 9, the processing device further to:

generate, in response to receiving the request to access the binary object, a contemporary cryptographic hash of the encrypted binary object;

determine that the contemporary cryptographic hash does not match the authoritative cryptographic hash; and provide an alert of the determining.

11. A non-transitory computer-readable storage medium comprising instructions, which when executed, cause a processing device to:

identify a binary object to be stored in a first data store;

encrypt, by the processing device, the binary object using a cryptographic function of a blockchain to generate an encrypted binary object;

store the encrypted binary object in the first data store;

encrypt a different binary object using the cryptographic function of the blockchain to generate a different encrypted binary object;

store the different encrypted binary object in a different data store;

store, on the blockchain, a reference to the encrypted binary object in the first data store and the different encrypted binary object in the different data store, wherein the reference is configured to aggregate, responsive to an interaction with the reference, the encrypted binary object and the different encrypted object to generate an aggregated encrypted binary object having a data size that exceeds a maximum data size associated with each block of the blockchain;

generate a copy of the encrypted binary object;

store the copy of the encrypted binary object in a second data store distributed from the first data store;

periodically determine whether the stored binary object and the copy of the binary object are identical; and regenerate the copy of the encrypted binary object to synchronize the copy of the binary object with the binary object when the stored binary object and the copy of the binary object are determined to not be identical.

12. The non-transitory computer-readable storage medium of claim 11, wherein the reference to the binary object comprises: a location of the binary object in the first data store and an authoritative cryptographic hash of the encrypted binary object.

13. The non-transitory computer-readable storage medium of claim 12, the processing device further to:

generate a contemporary cryptographic hash of the encrypted binary object;

determine that the contemporary cryptographic hash does not match the authoritative cryptographic hash; and provide an alert of the determining.

14. The non-transitory computer-readable storage medium of claim 12, the processing device further to:

receive a request to access the binary object;

generate, in response to receiving the request to access the binary object, a contemporary cryptographic hash of the encrypted binary object;

determine that the contemporary cryptographic hash does not match the authoritative cryptographic hash;

log data, associated with the accessing of the binary object, in the blockchain; and provide an alert of the determining.

* * * * *